United States Patent [19]

Kalaskie et al.

[11] Patent Number: 5,125,622
[45] Date of Patent: Jun. 30, 1992

[54] CYLINDER VALVE CONNECTION

[75] Inventors: William S. Kalaskie, McMurray; David E. Hughes, Pittsburgh, both of Pa.

[73] Assignee: Amcast Industrial Corporation, Washington, Pa.

[21] Appl. No.: 705,019

[22] Filed: May 22, 1991

[51] Int. Cl.$^5$ ............................................. F16K 41/12
[52] U.S. Cl. .................................. 251/63.4; 251/335.2
[58] Field of Search ....................... 251/63.4, 335.2; 137/315

[56] References Cited

U.S. PATENT DOCUMENTS

| | | | |
|---|---|---|---|
| 1,385,681 | 7/1921 | Hammond | 251/335.2 |
| 2,382,235 | 8/1945 | Lamar | 251/335.2 X |
| 2,629,576 | 2/1953 | Rudolph | 251/335.2 X |
| 2,642,255 | 6/1953 | Lindgren | 251/335.2 X |
| 3,979,105 | 9/1976 | Pool et al. | 251/335.2 X |
| 4,706,929 | 11/1987 | Kalaskie et al. | 251/14 |
| 4,776,562 | 10/1988 | Kalaskie et al. | 251/63.4 |

Primary Examiner—Stephen M. Hepperle
Attorney, Agent, or Firm—Richard V. Westerhoff

[57] ABSTRACT

An actuator-cylinder valve connection mechanism has a bonnet nut with external threads and receives an outer valve stem, a valve body having an upper end with internal and external threads with the internal threads in engagement with the external threads of the bonnet nut, and either a jam nut or an actuator housing of the actuator having a downward extension with internal threds in engagement with the external threads of the upper end of the valve body. Clearances, apertures, and a direct contact of the jam nut or the actuator housing against the top surface of the upper end of the valve body cause any impact or inertial forces to be circumvented from the jam nut or the housing and into the valve body, thereby entirely bypassing the sealing mechanism which is comprised of the bonnet nut.

12 Claims, 2 Drawing Sheets

CYLINDER VALVE CONNECTION

BACKGROUND OF THE INVENTION

1. Field of the Invention

This invention relates to an actuator-cylinder valve connection, and more particularly, to a connection mechanism therebetween that protects the cylinder valve stem sealing mechanism from forces imposed on the actuator and transmitted through the valve into the cylinder.

2. Background Information

In the past, high pressure compressed gas cylinder valves were operated almost exclusively by manual means; such as handwheels, levers, and wrenches. Recently, however, the use of automatic actuators have become more and more popular, especially in the semiconductor industry.

Automatic actuators, which may be pneumatic, electrical, or hydraulic, usually result in a significantly larger volume and mass when compared to the manual type actuator which is operated by a handwheel or lever connected to an outer valve stem threaded into a nut, which, in turn, is threaded onto the valve body. Consequently, this larger volume and mass of the automatic actuators constitute a larger weight atop the valve. This added weight is of particular importance should the cylinder, the valve, or the actuator itself be subjected to an impact force. Such forces may originate from a projectile or some other form of inadvertently applied impact force. These impact forces may also be generated simply by the cylinder falling over.

Thus, shock forces imposed in either manner may result in large direct impact and/or inertial forces being transmitted through the actuator to the valve connection, and eventually into the cylinder.

These manual and automatic valve actuator-cylinder valve connections commonly transmit direct impact forces imposed on the actuator, or inertial forces generated by the actuator, into a mechanical sealing mechanism between the actuator and cylinder valve which prevents the cylinder compressed gases from entering into the actuator or escaping to the environment.

U.S. Pat. Nos. 4,706,929 and 4,776,562 relate to automatic actuators. Typically, in an automatic actuator, as disclosed in the above patents, the sealing mechanism is formed by a diaphragm set seated against a shoulder of the valve body and held in place by a downward extension of the cylindrical housing of the automatic actuator. This extension abuts against the diaphragm set and has threads which engage those in the valve body. The forces discussed hereinabove tend to loosen the threaded connection between the extension of the housing and the valve body.

The sealing mechanism for a manually actuated actuator is similar to that for the automatic actuator, the main difference being that a bonnet nut and handwheel replace the automatic actuator with its cylindrical housing. Any axial or lateral forces applied to the handwheel of the manually actuated actuator pass into the outer valve stem into the bonnet nut, resulting in a disturbance or damage to the sealing mechanism formed between the bonnet nut and the valve body, and/or a loosening of the torque of the bonnet nut.

One feature of the present invention is to provide an actuator-cylinder valve connection that isolates the mechanical sealing mechanism from any such direct impact and/or inertial forces. In the present invention, these forces are circumvented around the sealing mechanism so as not to adversely affect the integrity of the seal.

Accordingly, it is a primary object of the present invention to provide an actuator-cylinder valve connection that will isolate the valve stem sealing mechanism located at the interface between the actuator and the valve from inertial forces generated by the actuator and/or impact forces applied to the actuator.

It is another object of the present invention to provide an actuator-cylinder valve connection whose integrity will be independent of cylinder pressure.

It is another object of the present invention to provide a connection mechanism which is readily adaptable to present-day manual and automatic actuator designs.

It is a broad object of the present invention to provide such a connection that is durable and reliable, and which can be easily and economically manufactured and assembled.

SUMMARY OF THE INVENTION

These and other objects are realized by the invention which includes a cylinder valve actuator, an integral connection mechanism, and the cylinder valve itself.

A connection mechanism for an automatic type actuator includes among other components, a cup-shaped, hollow cylindrical housing with an end wall and a necked-down internally threaded extension connected to external threads at the upper end of the valve body. The cylindrical housing forms a shoulder which abuts against the uppermost surface of the valve body.

The connection mechanism for a manual type actuator consists of a handwheel, handle, or lever mechanically attached to an outer valve stem which threads into a jam nut, which, in turn, is connected to external threads at the upper end of the valve body. The jam nut forms a shoulder which abuts against the upper most surface of the valve body.

A sealing mechanism is associated with the connection mechanism of the automatic and manual type actuators. This sealing mechanism consists of a set of thin, flexible diaphragms, clamped by a bonnet nut to a shoulder ledge of the valve body. The bonnet nut has external threads that engage internal threads at the top of the valve body. The bonnet nut fits closely around and is not mechanically attached to the upper valve stem. The bonnet nut is spaced away from the jam nut or the cylindrical housing of the actuator to form small clearances therebetween. An aperture or opening is formed in the threaded connection area of the bonnet nut and the upper end of the valve body. In the automatic type actuator adjacent to the clearance and, opposite to the first aperture, the cylindrical housing and bonnet nut form a second aperture or opening which seats an elastomeric sealing gasket. This sealing gasket prevents pneumatic gas or hydraulic fluid from leaking out of the actuator and into the connection mechanism. An O-ring is provided between the outer valve stem and the bonnet nut.

The gasket and O-ring are not required in the manual type actuator.

The connection mechanism for both the automatic and manual type actuators is such that any mechanically applied forces and/or impact or inertial forces applied to or generated by the actuator are transmitted directly into the valve body to the compressed gas cylinder thereby by-passing the sealing mechanism which isolates the cylinder pressure from the external environment and, in the case of automatic actuators, isolates the cylinder pressure from the inside of the actuator. The connection mechanism protects the sealing mechanism from forces transmitted between the actuator and the valve.

BRIEF DESCRIPTION OF THE DRAWINGS

A full understanding of the invention can be gained from the following description of the preferred embodiments when read in conjunction with the accompanying drawings in which.

DETAILED DESCRIPTION OF PREFERRED EMBODIMENTS

The invention is particularly suited for incorporation in both manual and automatic actuated valves for compressed gas cylinders which are subjected to rough handling, impact forces, falling over, being dropped, etc. and will so be described. However, features of the invention may be applicable to other types of valves.

Figure 1:
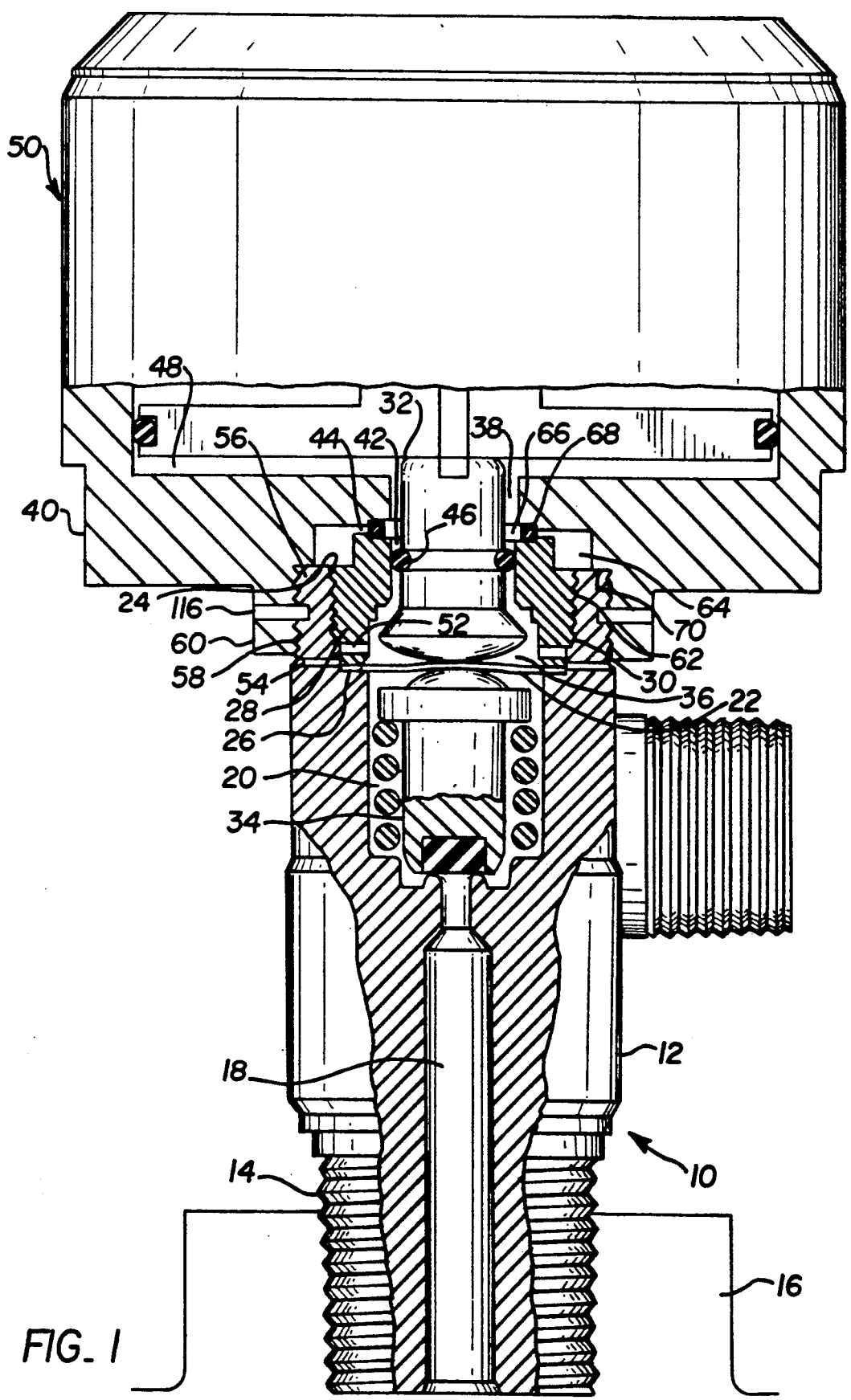
FIG. 1 is an elevational view partly in section of an automatic type actuator cylinder valve illustrating the teachings of the present invention.

Turning first to FIG. 1 of the drawings, an automatic type actuated valve 10 incorporating elements of the invention includes a valve body 12 having external threads 14 on one end for securing the valve 10 to the inlet of a compressed gas cylinder 16. A longitudinal bore in the valve body 12 forms an inlet passage 18 which communicates with a counterbore extending inward from the opposite end of the valve body 12 to form a valve chamber 20. The compressed gas in the cylinder 16 and the valve body 12 is prevented from escaping through the upper end of chamber 20 by a set of thin, flexible diaphragms 22.

Valve body 12 includes a threaded counterbore 24 concentric with the valve chambers 18 and 20 and forms a shoulder 26 which supports diaphragm set 22. A bonnet nut 28 has external threads 30 which engage the threads in counterbore 24 of valve body 12 as shown in FIG. 1. This arrangement causes the set of diaphragms 22 to be clamped against shoulder 26 of valve body 12 to create a seal at the top of chamber 20 in valve body 12.

An outer valve stem 32 bears against the top of diaphragm set 22 and an inner valve stem 34 bears against the underside of diaphragm set 22. Valve stem 32 and 34 cooperate to close the valve 10 in a well-known manner. Bonnet nut 28 forms a valve chamber 36 above chamber 20. Chambers 20 and 36 are separated by the set of diaphragms 22. Outer valve stem 32 extends through an annular opening 38 in actuator housing 40 and through an annular opening 42 in bonnet nut 28. The dimension of annular opening 42 in bonnet nut 28 is such that it forms a radial clearance between bonnet nut 28 and valve stem 32. An axial clearance 44 is formed between actuator housing 40 and bonnet nut 28. Clearance 44 is sufficiently small to prevent contact between actuator housing 40 and bonnet nut 28, for instance, less than 0.020 inch. Outer valve stem 32 has a groove for receiving an O-ring 46 which extends into the clearance in opening 42 in bonnet nut 28. This O-ring 46 forms a seal between bonnet nut 28 and valve stem 32.

O-ring 46 prevents leakage into the actuator cylinder chamber 48 should there be a structural failure to the set of diaphragms 22. Chamber 48 of actuator 50 may contain a gas, such as nitrogen or air, if pneumatically operated, or liquid if hydraulically operated, or ambient air if mechanically or electrically operated. Should the set of diaphragms 22 rupture, the compressed gas is prevented from entering the actuator chamber 48 by O-ring 46.

Optionally, a bleed hole 52 is provided in the bottom of bonnet nut 28, and a bleed hole 54 is provided in valve body 12 to permit gas to escape through the threaded connections between bonnet nut 28 and valve body 12, and between valve body 12 and cylinder housing of actuator 50 upon the rupture of diaphragm set 22 or the failure of O-ring 46 due to wear or deterioration. For the most part, the compressed gas in cylinder 16 will not escape through the threaded connections in view of the seal formed by the set of diaphragms 22, the shoulder 26 of valve body 12, and the underside of bonnet nut 28.

The upper end 56 of valve body 12 has external threads which engage the internal threads 58 of extension 60 of housing 40, and internal threads 62 which engage external threads 30 of bonnet nut 28. The connection mechanism for the automatic actuator of FIG. 1 is comprised of upper end 56 of valve body 12 and extension 60 of housing 40 of actuator 50. Bonnet nut 28 and actuator housing 40 form two apertures 64 and 66 which are adjacent to and in communication with axial clearance 44 formed between actuator housing 40 and bonnet nut 28. Aperture 66 seats a gasket 68 to form a seal to prevent gases from escaping from chamber 48 of actuator housing 40 into the threaded connection of valve body 12, bonnet nut 28, and housing 40.

The sealing mechanism of the valve shown in FIG. 1 comprises the set of diaphragms 22, bonnet nut 28, and the shoulder 26 of valve body 12. As stated hereinbefore, the sealing is effected by the set of diaphragms 22 seated against shoulder 26, and bonnet nut 28 which is screwed into the upper end 56 of valve body 12. A shoulder 70 is formed in housing 40 immediately adjacent to the downward extension 60 of housing 40 and rests against the top surface of upper end 56 of valve body 12. In view of the construction of the connection mechanism shown in FIG. 1 for a cylinder-actuator device, and in particular, the apertures 64 and 66, the axial clearance 44, the clearance formed by opening 42 in bonnet nut 28 between valve stem 32 and bonnet nut 28, and the shoulder 70 of actuator housing 40 abutting against the top surface of the upper end 56 of valve body 12, any radial or axial forces applied against actuator 50 will pass into housing 40, and directly into valve body 12 without disrupting or disturbing the seal formed by diaphragm set 22 with bonnet nut 28 and valve body 12.

The automatic type actuated valve illustrated in FIG. 1 is pneumatically actuated and is disclosed in U.S. Pat. No. 4,776,562 which is incorporated herein by reference thereto. One of the main differences between the device of this 4,776,562 patent and the invention is bonnet nut 28, and the construction and arrangement of upper end 56 of valve body 12 and the downward extension 60 of actuator housing 40 of actuator 50. That is, in the invention, actuator housing 40 receives the valve body, whereas in the 4,776,562 patent, the valve body receives the actuator housing.

Figure 2:
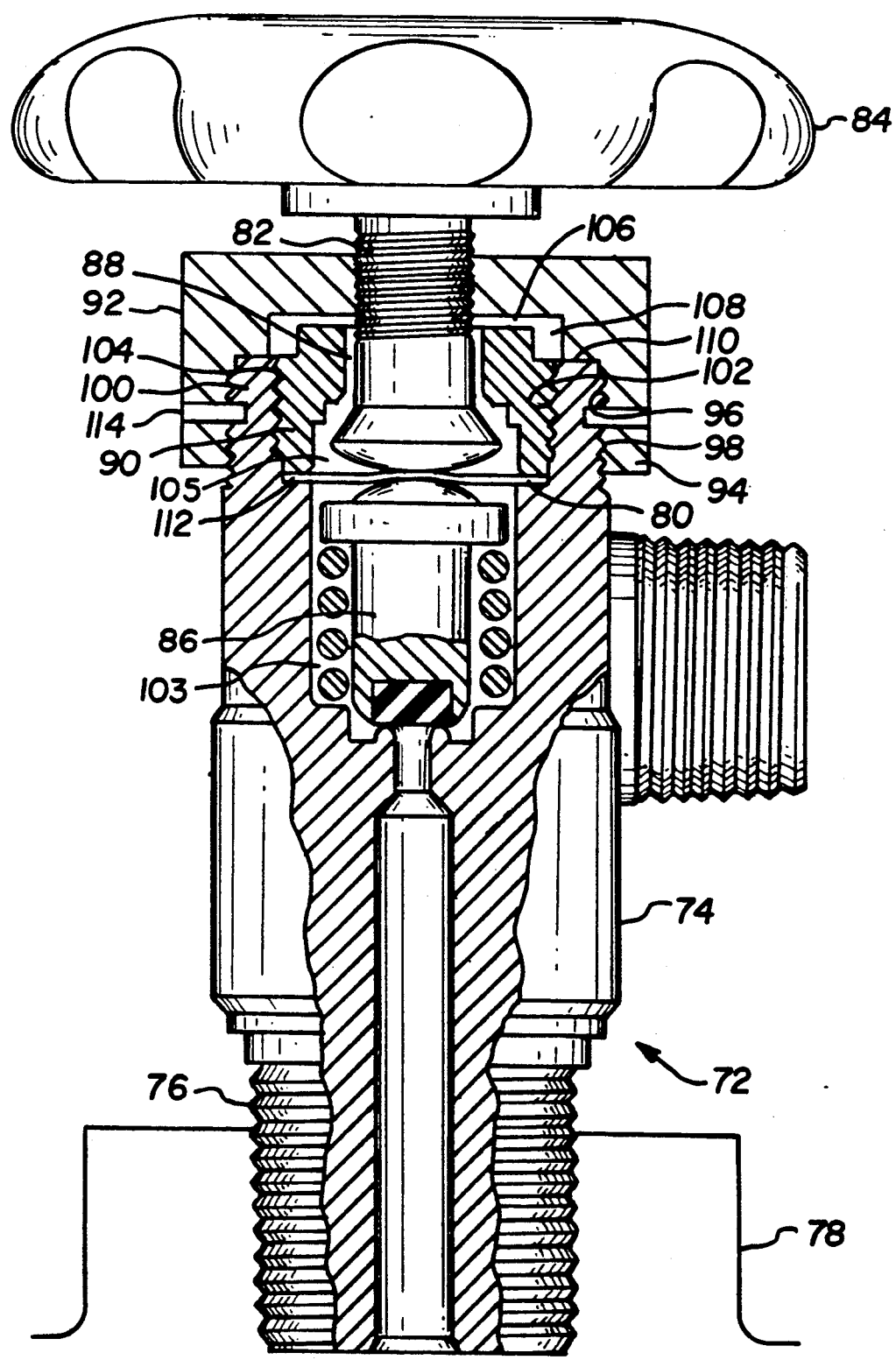
FIG. 2 is an elevational, partly in section view of a manual type actuator cylinder valve illustrating the teachings of the present invention.

Turning now to FIG. 2, a manually actuated valve 72 incorporating elements of the invention includes a valve body 74 having external threads 76 on one end for securing the valve in the inlet of a compressed gas cylinder 78. The elements of valve 72 up to and including a set of diaphragms 80 are similar to those of the valve 10 of FIG. 1.

An outer valve stem 82 which is mechanically attached to a handwheel 84 bears against the top of the set of diaphragms 80, and together with inner valve stem 86 which bears against the underside of the set of diaphragms 80 operate to close the valve 72. Outer valve stem 82 extends through annular opening 88 in a bonnet nut 90. Outer valve stem 82 is secured in a jam nut 92 by threads as shown in FIG. 2.

Jam nut 92 has a downward extension 94 with internal threads indicated at 96 which thread onto external threads indicated at 98 on an upper end 100 of valve body 74. Upper end 100 of valve body 74 also has internal threads indicated at 102. Bonnet nut 90 has external threads 104 which engage with internal threads 102 of upper end 100 of valve body 74. Outer valve stem 82 extends through aperture 88 in bonnet nut 90. The dimensions of aperture 88 is such that a clearance is formed between outer valve stem 82 and bonnet nut 90. This clearance between outer valve stem 82 and bonnet nut 90 is small and is shown in exaggerated form in FIG. 2. This is also true for the clearance formed by opening 42 around outer valve stem 32 in FIG. 1. An axial clearance indicated at 106 is formed between jam nut 92 and bonnet nut 90. An aperture 108 located adjacent to clearance 106 is also formed by jam nut 92 and bonnet nut 90. The downward extension 94 of jam nut 92 forms a shoulder 110 adjacent to aperture 108 which abuts against the top surface of upper end 100 of valve body 74.

As can be seen to the left and to the bottom of outer valve stem 82 in FIG. 2, upper end 100 of valve body 74 forms a shoulder 112 against which diaphragm set 80 rests. The external threads 104 of bonnet nut 90 engage with the internal threads 102 of the upper end 100 of valve body 74 to force the set of diaphragms 80 against shoulder 112 to form a seal between chambers 103 and 105.

Since there is a clearance 106 between jam nut 92 and bonnet nut 90, a clearance formed by aperture 88 in bonnet nut 90, an aperture 108, and no mechanical connection between outer valve stem 82 and bonnet nut 90, or between jam nut 92 and bonnet nut 90, any axial or lateral forces applied to handwheel 84 or to jam nut 92 are circumvented into the jam nut 92 and into the valve body 74. These forces, which normally would break or disturb the seal created by the sealing mechanism of the device, are now prevented from entering the sealing mechanism of the actuator-cylinder device to maintain the sealing effect thereof.

Optionally, lock pin 114 of FIG. 2 can be used to secure jam nut 92 to valve body 74. Similarly, lock pin 116 of FIG. 1 can be used to secure actuator housing 40 to valve body 12. Bleed holes (not shown) can optionally be provided in the arrangement of FIG. 2 to allow the escape of cylinder gases to the atmosphere should the diaphragm set 80 rupture. Both actuator housing 40 and jam nut 92 are annular housing members.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. An actuator-cylinder valve device, having an actuator, and inner and outer valve stems, comprising:

a valve body, for substantially housing said inner and outer valve stems, having an upper end with external and internal threaded portions, said upper end forming an inner shoulder in the vicinity of said internal threaded portion of said upper end, an annular housing being part of said actuator, and having an annular extension with an internal threaded portion in engagement with said external threaded portion of said first upper end of said valve body, an uninterrupted diaphragm means having an inner surface against which said inner valve stem bears and an outer surface against which said outer valve stem bears, said diaphragm means being supported at a peripheral edge by said inner shoulder of said valve body, and bonnet nut means having an annular opening through which said outer valve stem extends and having an externally threaded portion for engagement with said internal threaded portion of said upper end of said valve body for clamping said diaphragm means against said inner shoulder of said valve body to effect a seal between said inner and outer valve stems, said annular housing and said bonnet nut means forming an axial clearance therebetween in an area near said outer valve stem, whereby forces associated with said actuator are circumvented from said bonnet nut means and travel through said annular housing and directly into said valve body.

2. A device of claim 1, wherein said upper end of said valve body has top surfaces, wherein said annular housing has a shoulder located adjacent to said annular extension which abuts against said top surfaces of said upper end of said valve body, and wherein said bonnet nut means extends axially beyond the top surfaces of the upper end of said valve body and is spaced from said annular housing by said axial clearance.

3. A device of claim 2, wherein said annular opening of said bonnet nut means forms a clearance between said outer valve stem and said bonnet nut means in the vicinity near said axial clearance formed by said annular housing and said bonnet nut means.

4. A device of claim 3 wherein said annular housing and said bonnet nut means further form an aperture located adjacent to said axial clearance.

5. A device of claim 1, wherein the dimension of said annular opening of said bonnet nut is greater than the outer dimension of said valve stem to form a clearance between said outer valve stem and said bonnet nut means which guides said outer valve stem for axial movement.

6. A device of claim 1 wherein said annular housing, said upper end of said valve body, and said bonnet nut means form an aperture near the area of said external threaded portion of said bonnet nut means and said internal threaded portion of said upper end of said valve body.

7. A device of claim 1, wherein said actuator is a pneumatic actuator, wherein said annular housing means is a cylinder housing of said pneumatic cylinder, wherein said annular housing and said bonnet nut means form an aperture located adjacent to said axial clearance, and wherein said device further includes a first sealing element seated in said axial clearance.

8. A device of claim 7, wherein said annular opening of said bonnet nut means is dimensioned to form a clearance between said outer valve stem and said bonnet nut means, and wherein said device further consists of a second sealing element extending into said clearance between said outer valve stem and said bonnet nut means to form a seal therebetween.

9. A device of claim 8, wherein said bonnet nut means forms a chamber around said outer valve stem, and further comprising first bleed means in said bonnet nut means for allowing gas to escape from said chamber.

10. A device of claim 9, further comprising second bleed means located in said upper end of said valve body and in communication with said first bleed means of said bonnet nut means.

11. A device of claim 1, wherein said device is manually activated, and wherein said annular housing means of said actuator is a jam nut, said jam nut having a threaded portion in threaded engagement with said external threaded portion of said upper end of the valve body.

12. A device of claim 1, further comprising pin means located in said upper end of said annular housing for securing said annular housing to said valve body.

* * * * *